(12) United States Patent
Rozman et al.

(10) Patent No.: US 9,660,563 B2
(45) Date of Patent: May 23, 2017

(54) HIGH VOLTAGE DIRECT CURRENT SYSTEM WITH IMPROVED GENERATOR EXCITATION

(71) Applicant: Hamilton Sundstrand Corporation, Charlotte, NC (US)

(72) Inventors: Gregory I. Rozman, Rockford, IL (US); Steven J. Moss, Rockford, IL (US); Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/744,094

(22) Filed: Jun. 19, 2015

(65) Prior Publication Data
US 2016/0373038 A1    Dec. 22, 2016

(51) Int. Cl.
| | |
|---|---|
| H02P 9/10 | (2006.01) |
| H02P 9/14 | (2006.01) |
| H02P 9/00 | (2006.01) |
| H02P 9/30 | (2006.01) |
| H02P 9/48 | (2006.01) |
| H02P 3/00 | (2006.01) |
| H02P 101/25 | (2016.01) |
| H02P 101/30 | (2015.01) |

(52) U.S. Cl.
CPC .............. *H02P 9/007* (2013.01); *H02P 9/009* (2013.01); *H02P 9/302* (2013.01); *H02P 9/305* (2013.01); *H02P 9/48* (2013.01); *H02P 2101/25* (2015.01); *H02P 2101/30* (2015.01)

(58) Field of Classification Search
USPC ....................................... 322/10, 63; 290/44
See application file for complete search history.

(56) References Cited

U.S. PATENT DOCUMENTS

| | | | |
|---|---|---|---|
| 4,723,106 A | 2/1988 | Gibbs et al. | |
| 4,743,777 A * | 5/1988 | Shilling | F02N 11/04 290/31 |
| 5,444,349 A * | 8/1995 | Rozman | F02N 11/04 318/400.41 |
| 5,493,200 A | 2/1996 | Rozman et al. | |

(Continued)

FOREIGN PATENT DOCUMENTS

| | | |
|---|---|---|
| EP | 2779420 A2 | 9/2014 |
| WO | 9907056 A1 | 2/1999 |

OTHER PUBLICATIONS

EP SR, Issued Dec. 12, 2016, U380575EP.

(Continued)

*Primary Examiner* — Pedro J Cuevas
(74) *Attorney, Agent, or Firm* — Cantor Colburn LLP (57) ABSTRACT

According to one embodiment of the present invention, a variable frequency generator is provided. The variable frequency generator can comprise a main stator comprising multi-phase armature windings and an exciter field winding; and a rotating portion comprising an exciter multi-phase windings, a main field winding, and an amplification component between the exciter windings and the main field winding, wherein the amplification component operates at a variable duty cycle to maintain a phase voltage of the main stator armature windings near independent of a shaft speed of the variable frequency generator.

14 Claims, 6 Drawing Sheets

(56) References Cited

U.S. PATENT DOCUMENTS

| | | | |
|---|---|---|---|
| 5,594,322 A * | 1/1997 | Rozman | F02N 11/04 318/400.12 |
| 7,095,133 B2 * | 8/2006 | Kimura | H02P 9/007 290/44 |
| 7,157,804 B2 * | 1/2007 | Kimura | H02P 9/007 290/44 |
| 7,301,311 B2 | 11/2007 | Xu et al. | |
| 7,518,258 B1 * | 4/2009 | Marvin | F03D 7/0272 290/44 |
| 7,525,211 B2 * | 4/2009 | Marvin | F03D 1/02 290/44 |
| 7,638,983 B2 * | 12/2009 | Park | H02M 5/4585 290/44 |
| 7,687,928 B2 * | 3/2010 | Taneja | F01D 15/10 290/31 |
| 7,728,450 B2 * | 6/2010 | Marvin | F03D 1/02 290/44 |
| 8,378,641 B2 * | 2/2013 | Rozman | H02J 3/36 322/24 |
| 8,699,251 B2 | 4/2014 | Rozman et al. | |
| 8,836,293 B1 | 9/2014 | Rozman et al. | |
| 8,912,765 B2 | 12/2014 | Rozman et al. | |
| 8,975,876 B2 | 3/2015 | Rozman et al. | |
| 9,458,756 B2 * | 10/2016 | Arai | B60K 11/02 |
| 2005/0151504 A1 * | 7/2005 | Kimura | H02P 9/007 318/807 |
| 2006/0138980 A1 * | 6/2006 | Kimura | H02P 9/007 318/140 |
| 2008/0093850 A1 * | 4/2008 | Taneja | F01D 15/10 290/36 R |
| 2008/0315585 A1 * | 12/2008 | Marvin | F03D 1/02 290/44 |
| 2008/0315586 A1 * | 12/2008 | Marvin | F03D 1/02 290/44 |
| 2009/0079194 A1 * | 3/2009 | Marvin | F03D 7/0272 290/44 |
| 2009/0167026 A1 * | 7/2009 | Marvin | F03D 1/04 290/55 |
| 2012/0007428 A1 * | 1/2012 | Rozman | H02J 3/36 307/66 |
| 2014/0265744 A1 | 9/2014 | Rozman et al. | |
| 2014/0266078 A1 | 9/2014 | Rozman et al. | |
| 2016/0197600 A1 * | 7/2016 | Kuznetsov | H03K 3/45 307/106 |
| 2016/0268942 A1 * | 9/2016 | Rozman | H02P 9/305 |
| 2016/0301345 A1 * | 10/2016 | Frampton | H02P 9/00 |
| 2016/0380568 A1 * | 12/2016 | Rozman | H02P 9/007 322/61 |

OTHER PUBLICATIONS

Xin Zhao, et al.; "Review of Aircraft Electric Power Systems and Architechtures"; Energycon, May 13-16, 2014, Dubrovnik, Croatia; pp. 949-953.

* cited by examiner

HIGH VOLTAGE DIRECT CURRENT SYSTEM WITH IMPROVED GENERATOR EXCITATION

BACKGROUND OF THE INVENTION

In general, a variable frequency generator, which can be a single wound field synchronous generator, provides simplified power generation solutions by eliminating a need for a constant speed drive, as the variable frequency generator is allowed to rotate at a variable speed. Electrical power of the variable frequency generator can be used to power a variety of electrical loads through the use of power electronics and conversion equipment.

Yet, a dynamic performance of a variable frequency electrical system that includes the variable frequency generator is subject to a range of speed variations of a prime mover. Further, with respect to variable frequency electrical system, voltage regulation dynamics under wide and sudden speed variations can cause severe overvoltage conditions. These overvoltage conditions can be further aggravated when using direct current (DC) output voltage to power a DC-DC converter that controls synchronous exciter field current of the variable frequency electrical system.

BRIEF DESCRIPTION OF THE INVENTION

According to one embodiment of the present invention, a variable frequency generator is provided. The variable frequency generator can comprise a main stator comprising multi-phase armature windings and an exciter field winding; and a rotating portion comprising an exciter multi-phase windings, a main field winding, and an amplification component between the exciter windings and the main field winding, wherein the amplification component operates at a variable duty cycle to maintain a phase voltage of the main stator armature windings near independent of a shaft speed of the variable frequency generator.

According to another embodiment of the present invention, a high voltage direct current system is provided. The high voltage direct current system is provided comprises a variable frequency generator that comprises a main stator comprising armature windings; and an exciter field winding; and a rotating portion comprising exciter multi-phase windings, a main field winding, and an amplification component between the exciter multi-phase windings and the main field winding, wherein the amplification component operates at a variable duty cycle to maintain a phase voltage of the main stator armature windings near independent of a shaft speed of the variable frequency generator; and a rotating controller configured to interface with and manage operations of the amplification component by detecting at least one input signal from the exciter multi-phase windings, retrieving a value based on the at least one input signal, and providing an input for at least one gate of the amplification component.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In view of the above, embodiments of the present invention disclosed herein improved voltage regulation dynamics with respect to variable frequency electrical systems. For instance, in a high voltage direct current system, when a portion of an output power powers exciter field winding, embodiments of the present invention disclosed herein improved the voltage regulation dynamics of the high voltage direct current system.

Figure 1A:
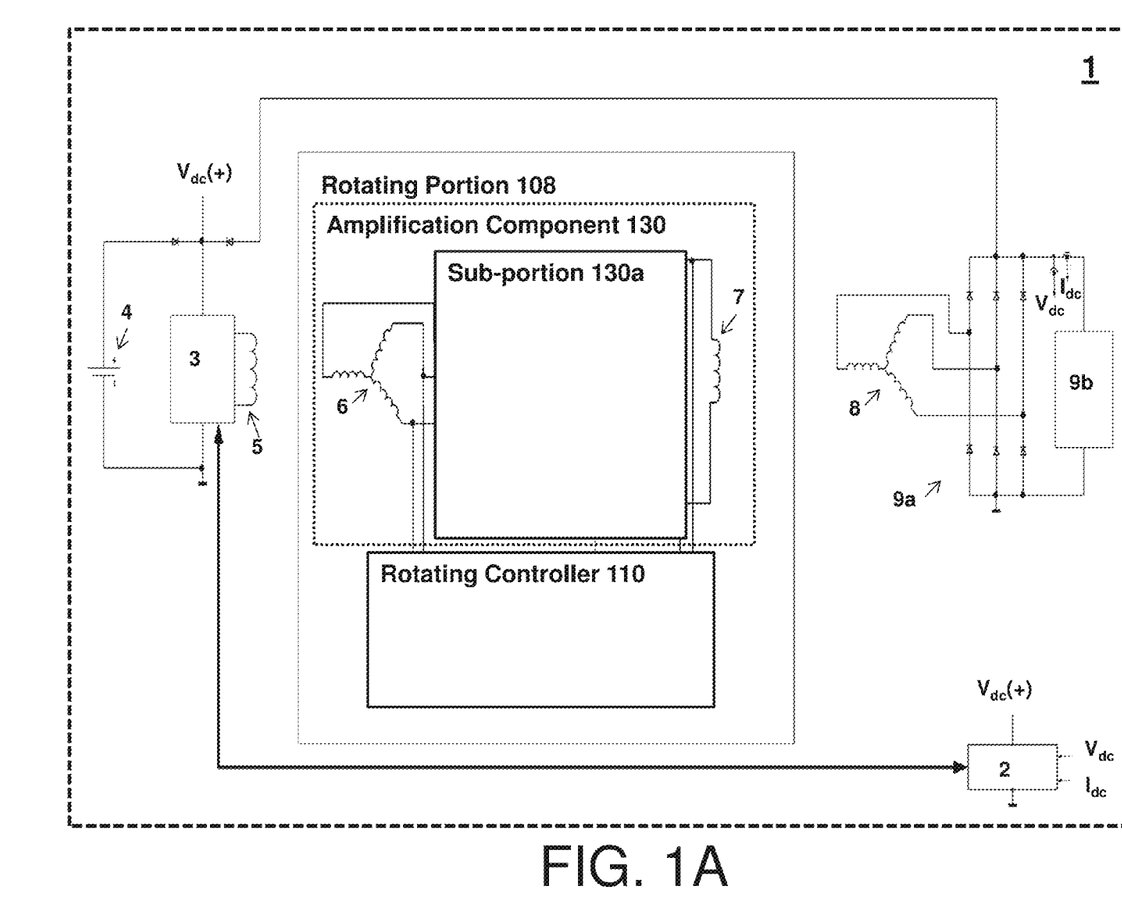
FIG. 1A is a diagram of a high voltage direct current system according to an embodiment.

FIG. 1 is a diagram of a high voltage direct current system 1 of according to an embodiment. The high voltage direct current system 1 utilizes direct current for transmission of electrical power.

The high voltage direct current system 1 comprises a variable frequency generator driven by a prime mover, such as a gas turbine engine or an internal combustion engine. The high voltage direct current system 1 also comprises a generator control unit 2, stationary DC-DC converter 3, a battery 4, an exciter field winding 5, exciter multi-phase windings 6, a main field winding 7, stator armature windings 8, an output rectifier 9a, a DC load 9b, a rotating controller 108, a rotating controller 110, an amplification component 130, and a sub-portion 130a.

In operation, the battery 4 can provide initial power to the stationary DC-DC converter 3 that controls current in an exciter field winding 5, which is positioned with respect to the exciter multi-phase windings 6. In turn, the AC power induced at the exciter multi-phase windings 6 is rectified by the rotating rectifier 250 (e.g., a six-pulse rotating rectifier) and converted into DC bus voltage by the sub-portion 130a. The DC bus voltage from the sub-portion 130a is applied to the main field winding 7. This induces an AC voltage in the stator armature windings 8 connected to the output rectifier 9a. Next, the AC voltage induced the main stator armature windings is rectified by the output rectifier 9a and applied to the DC load 9b.

Figure 1B:
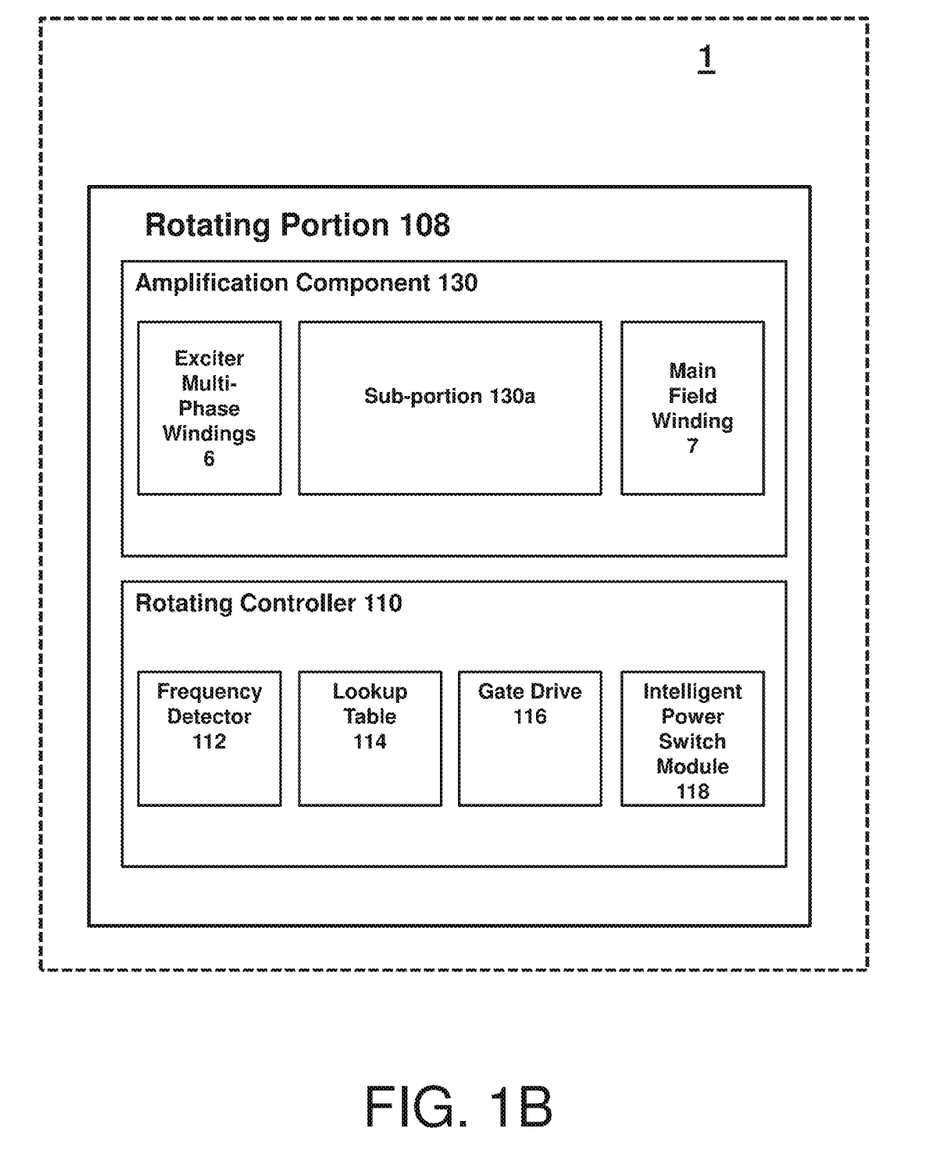
FIG. 1B is a diagram of a rotating portion of a high voltage direct current system according to an embodiment.

Turning now to FIG. 1B, the rotating portion 108 of the system 1 will now be described.

The rotating controller 110 can be a chip or a stand-alone device that interfaces with the amplification component 130 to manage the operation of the amplification component 130. The rotating controller 110 includes a frequency detector 112, a lookup table 114, a gate drive 116, and an internal power supply 118, along with a processor and a memory to execute operations of the rotating controller.

The frequency detector 112 has inputs which correspond to different input signals to detect a frequency or phase and outputs signals that instruct subsequent circuitry (e.g., the lookup table 114 and the gate drive 116) on how to adjust to lock onto the frequency or the phase.

The lookup table 114 can be a plurality of arrays/tables for retrieving a value based on the outputs of the frequency detector 112. The tables may be pre-calculated and stored in program storage or hardware of the rotating controller 110.

The gate drive 116 can be a power amplifier that accepts a low-power input value from the lookup table 114 and produces an input for gates of amplification component 130.

The internal power supply (IPS) 118 provides control power to the rotating controller components. The power is derived from the rotating DC bus that powers the main field winding, The processor may include any processing hardware, software, or combination of hardware and software utilized by the rotating controller 110 that carries out computer readable program instructions by performing arithmetical, logical, and/or input/output operations. Examples of the processor include, but are not limited to an arithmetic logic unit, which performs arithmetic and logical operations; a control unit, which extracts, decodes, and executes instructions from a memory; and an array unit, which utilizes multiple parallel computing elements. The memory may include a tangible device that retains and stores the computer readable program instructions for use by the processor of the rotating controller 110.

The amplification component 130 comprises the exciter multi-phase windings 6, the sub-portion 130a, and the main field winding 7. The sub-portion 130a can comprise a boost DC-DC converter, as seen below with respect to FIGS. 2-3, or a boost active rectifier, as seen below with respect to FIG. 4-5.

Figure 2:
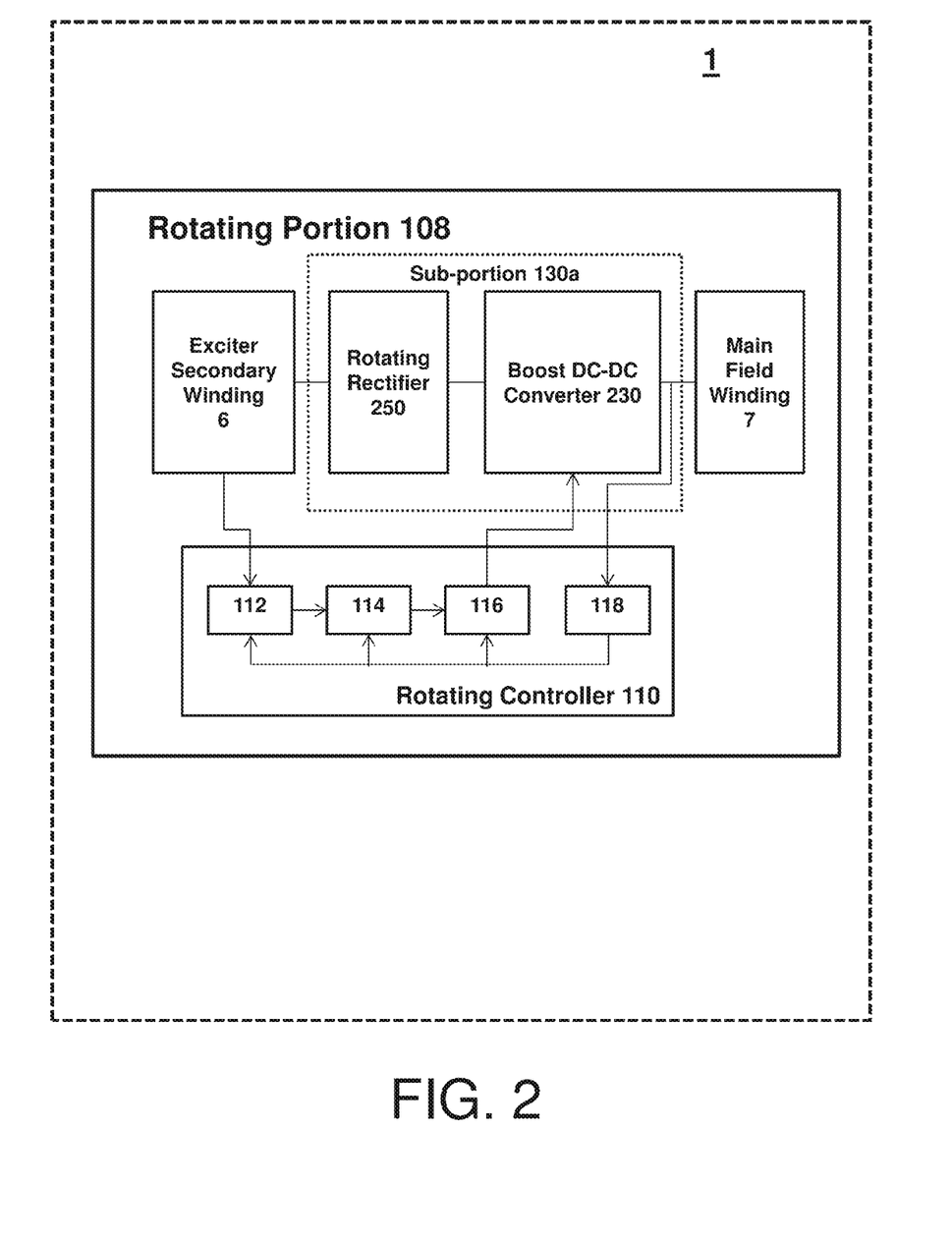
FIG. 2 is a diagram of high voltage direct current system with rotating boost converter according to an embodiment.

Turning now to FIG. 2, a diagram of the rotating portion 108 of the high voltage direct current system 1 with a rotating DC-DC boost converter 230 according to an embodiment is shown. The high voltage direct current system 1, in this example is a high voltage direct current electric power generating system that includes a wound field synchronous generator as the rotating portion 108. The wound field synchronous generator includes a rotating boost DC-DC converter 230 (note that different types of boost, buck, or buck-boost converters may also be employed), an exciter multi-phase windings 6, a rotating rectifier 250 (note that the system 1 could employ an active or passive rectifier), and a main field winding 7. The rotating controller 110 regulates a duty cycle of the boost DC-DC converter 230 in response to the generator speed.

The wound field synchronous generator is configured with respect to a generator control unit that provides current command to the stationary DC-DC converter in response to an output voltage and current, a battery diode-OR connected to the stationary DC-DC converter, a diode-OR connection of output rectified DC power to the stationary DC-DC converter, and a DC load connected to the output rectifier.

In operation, the battery 4 can provide initial power to the stationary DC-DC converter 3 that controls current in the exciter field winding 5, which is positioned with respect to the exciter multi-phase windings 6. In turn, the AC power induced at the exciter multi-phase windings 6 is rectified by the rotating rectifier 250 (e.g., a six-pulse rotating rectifier) and converted into DC bus voltage by the boost DC-DC converter 230. The DC bus voltage is applied to the main field winding 7. This induces an AC voltage the main stator armature windings 8 connected to the output rectifier 9a. Next, the AC voltage induced the main stator armature windings 8 is rectified by the output rectifier 9a and applied to the DC load 9b.

A portion of output rectified power is applied via diode-OR to the stationary DC-DC converter 3 effectively disconnecting battery 4 from the stationary DC-DC converter 3 after initial start-up sequence, when the battery connected diode-OR becomes reversed biased (Vdc_out>Vdc_batt).

Figure 3:
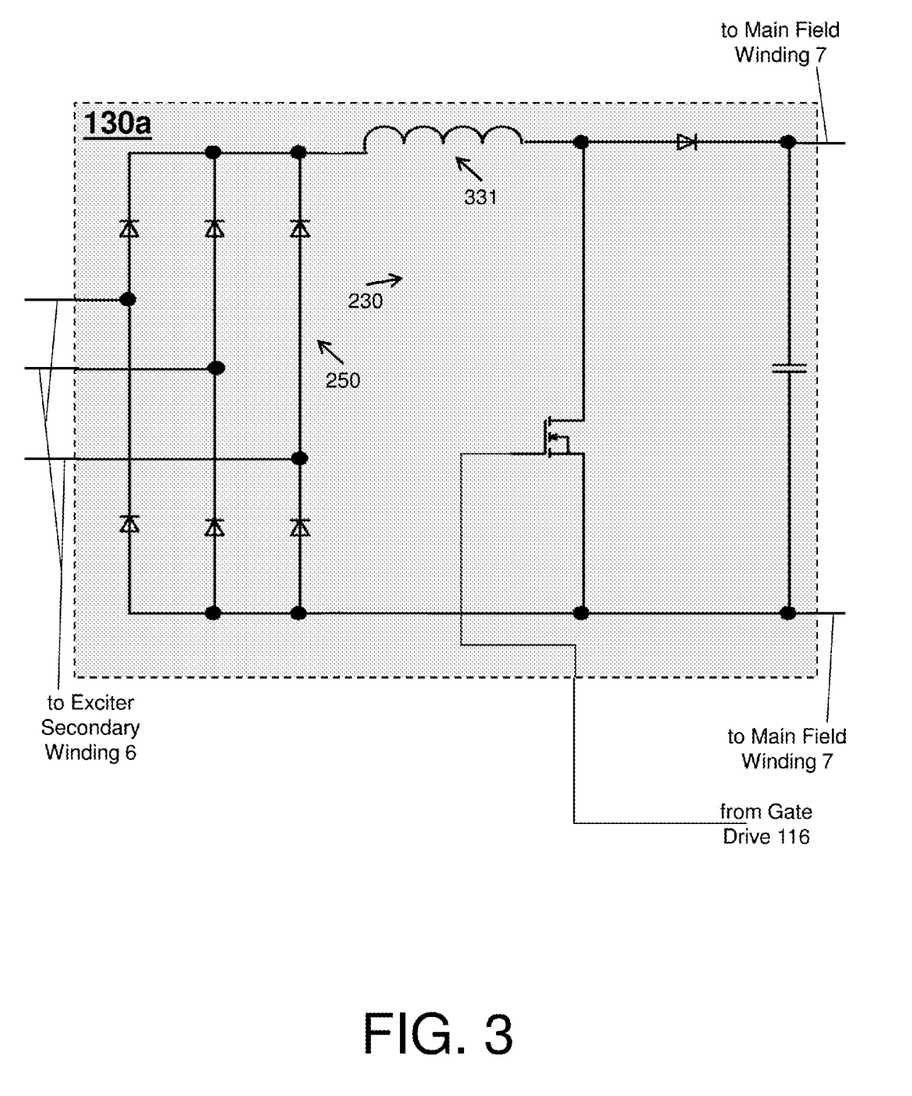
FIG. 3 is a diagram of boost DC-DC converter according to an embodiment.

The boost DC-DC converter 230 (a.k.a. a rotating boost DC-DC converter and rotating boost converter) operates at a variable duty cycle to maintain phase voltage of the main stator armature windings 8 near independent of a generator shaft speed. An example configuration of the sub-portion 130a with the boost DC-DC converter 230 and the rotating rectifier 250 is shown in FIG. 3, which includes a DC boost inductor 331. For a given exciter field current and zero duty cycle of the boost DC-DC converter 230, the voltage across the main field winding 7, as well as the main field current, are proportional to the generator shaft speed.

Similarly, the wound field synchronous generator output phase voltage is also proportional to the generator shaft speed for a given main field current and load. The steady-state output phase voltage is, therefore, proportional of $\omega^2$ for a constant exciter field current and load, where $\omega$ is the generator shaft speed.

The main field current is regulated by controlling the duty cycle of the boost DC-DC converter 230 to achieve a near constant output voltage independent of the generator shaft speed at a given exciter field current and load. The output load voltage is controlled by the generator control unit via commanding current in the exciter primary winding driven by the stationary DC-DC converter. The current in the exciter field winding in turn controls rotating DC bus voltage and generator main field current.

Figure 4:
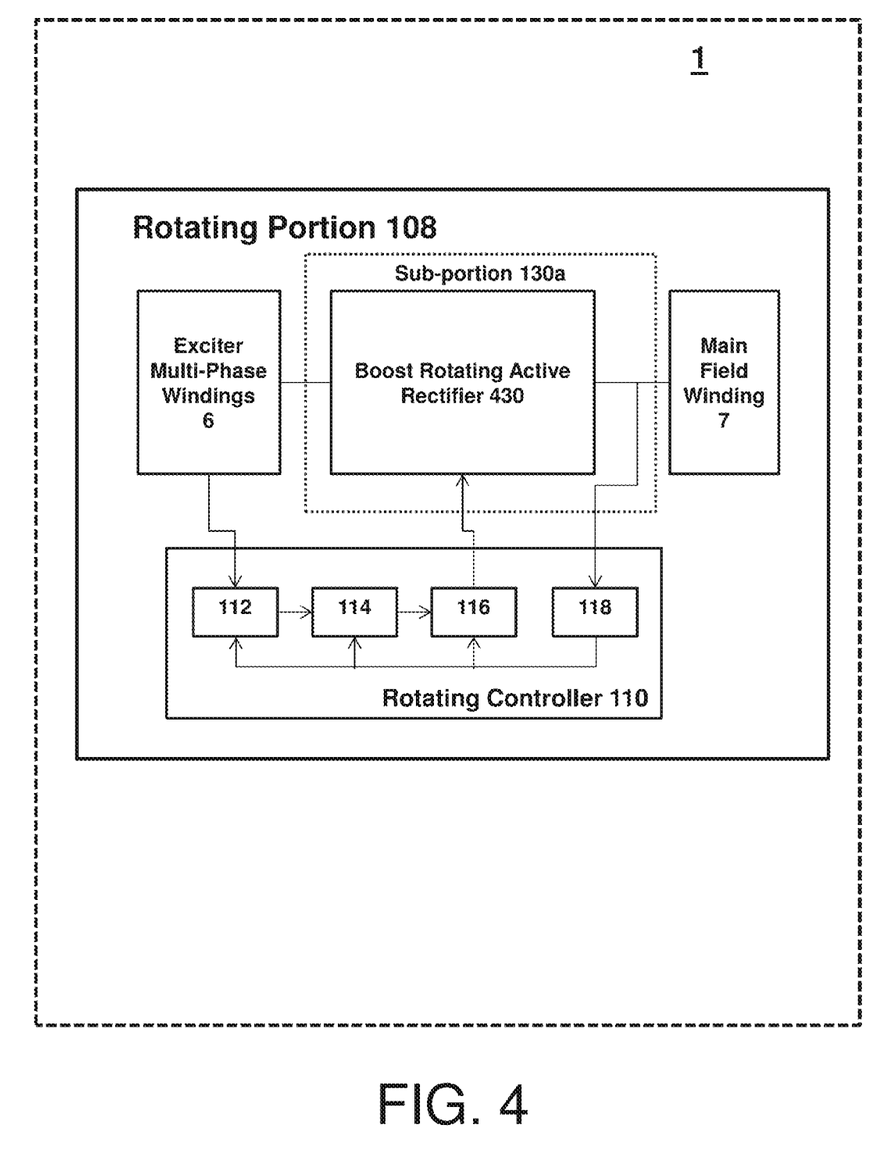
FIG. 4 is a diagram of high voltage direct current system with boost rotating active rectifier according to an embodiment.

Turning now to FIG. 4, a diagram of the rotating portion 108 of the high voltage direct current system 1 with a boost rotating active rectifier 430 according to an embodiment is shown. In FIG. 4, the rotating rectifier 250 and the boost DC-DC converter 230 are replaced by the boost rotating active rectifier 430.

Figure 5:
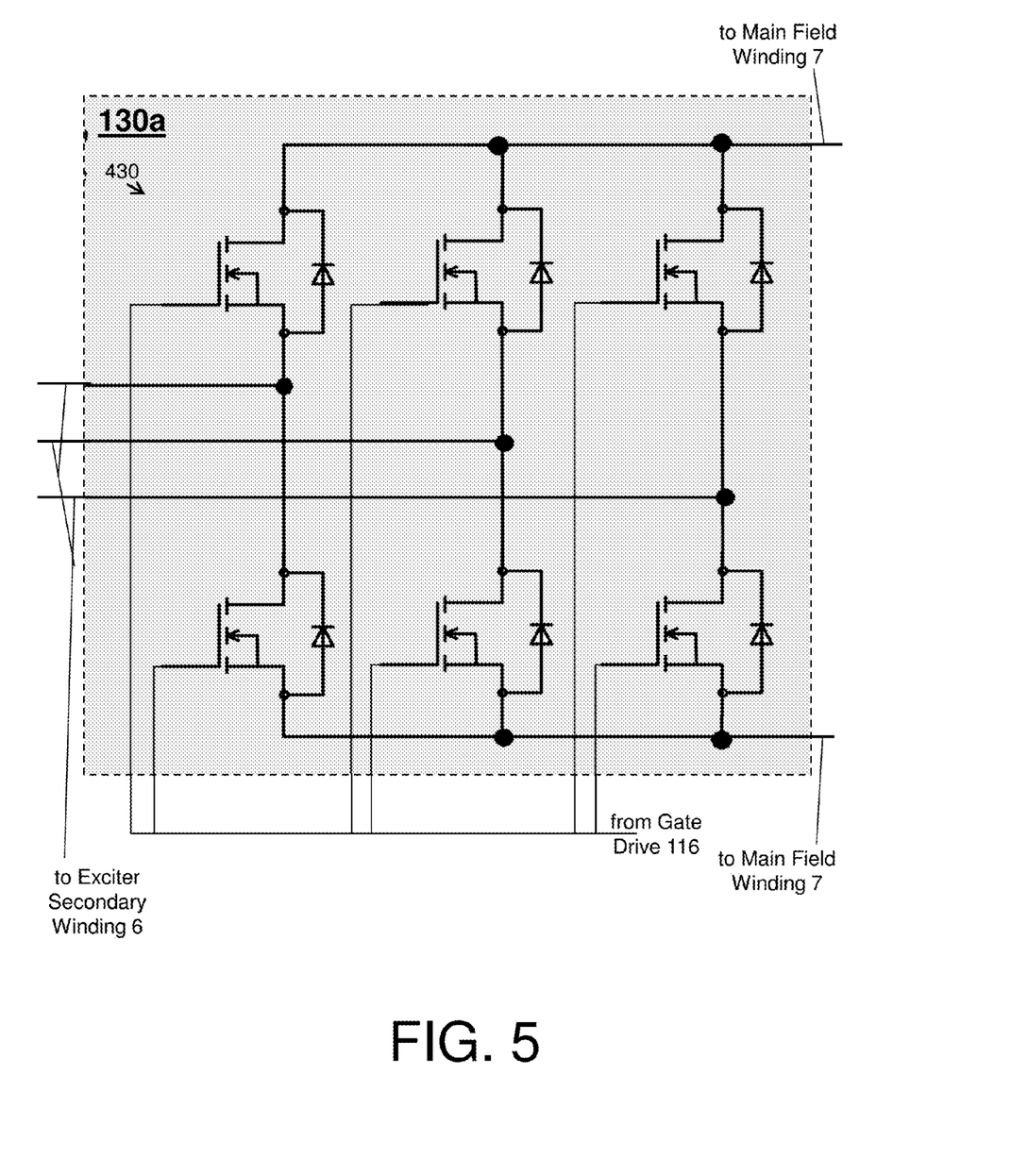
FIG. 5 is a diagram of a boost rotating active rectifier according to an embodiment.

The boost rotating active rectifier 430, while increasing a complexity of control circuitry that requires PLL (not shown) to estimate electrical phase from the exciter frequency, enables elimination of the DC boost inductor 331 and associated weight. Further, the boost rotating active rectifier 430 does not include a current loop control and operates at a variable duty cycle as a function of generator shaft speed, as discussed above. An example configuration of the boost rotating active rectifier is shown in FIG. 5.

The technical effects and benefits of embodiments of the amplification component include improving voltage regulation, improving overvoltage protection, and simplifying a rotating power controller by eliminating a communication transformer or power line communication to pass feedback signals over an air gap. In this way, embodiments of the high voltage direct current system improve the performance and economy of power generating systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A variable frequency generator, comprising:
 a main stator comprising of multi-phase armature windings;
 an exciter field winding,
 a rotating portion comprising exciter multi-phase windings, a main field winding, and an amplification component between the exciter multi-phase windings and the main field winding,
 wherein the amplification component operates at a variable duty cycle to maintain a phase voltage of the armature windings near independent of a shaft speed of the variable frequency generator; and
 a rotating controller,
 wherein the rotating controller interfaces with and manages operations of the amplification component.

2. The variable frequency generator of claim 1, wherein the rotating controller includes a frequency detector, a lookup table, and a gate drive.

3. The variable frequency generator of claim 2, wherein the frequency detector receives at least one input signal from the exciter multi-phase windings, detects a frequency or phase from the at least one input signal, and outputs a frequency signal to the lookup table.

4. The variable frequency generator of claim 2, wherein the lookup table receives a frequency signal from the frequency detector, retrieves a value based on the frequency signal, and supplies a value signal to the gate drive.

5. The variable frequency generator of claim 2, wherein the gate drive receives a value signal from the lookup table and produces an input for at least one gate of the amplification component.

6. The variable frequency generator of claim 1, wherein the amplification component comprises a rotating boost converter, wherein the rotating boost converter is in electrical communication with a rotating controller.

7. The variable frequency generator of claim 6, wherein the rotating controller regulates a duty cycle of the rotating boost converter in response to a speed of the variable frequency generator.

8. The variable frequency generator of claim 6, wherein the rotating boost converter comprises a direct current boost inductor.

9. The variable frequency generator of claim 1, wherein the amplification component is a boost rotating active rectifier.

10. The variable frequency generator of claim 9, wherein the boost rotating active rectifier operates at a variable duty cycle as a function of generator shaft speed.

11. The variable frequency generator of claim 1, wherein the variable frequency generator is include in a high voltage direct current system.

12. A high voltage direct current system, comprising a variable frequency generator that comprises:
 a main stator comprising armature windings;
 an exciter field winding; and
 a rotating portion comprising exciter multi-phase windings, a main field winding, and an amplification component between the exciter multi-phase windings and the main field winding, wherein the amplification component operates at a variable duty cycle to maintain a phase voltage of the main stator armature windings near independent of a shaft speed of the variable frequency generator; and
 a rotating controller configured to interface with and manage operations of the amplification component by detecting at least one input signal from the exciter multi-phase windings, retrieving a value based on the at least one input signal, and providing an input for at least one gate of the amplification component.

13. The high voltage direct current system of claim 12, wherein the amplification component comprises a rotating boost converter and a rotating rectifier in electrical communication with a rotating controller.

14. The high voltage direct current system of claim 12, wherein the amplification component comprises a rotating boost converter that comprises a direct current boost inductor.

* * * * *